(12) United States Patent
Yun et al.

(10) Patent No.: US 12,508,920 B2
(45) Date of Patent: Dec. 30, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventors: Sok Young Yun, Yongin-si (KR); Yeahn Yoon, Hwaseong-si (KR); Sanghyun Jeong, Hwaseong-si (KR); Joomi Park, Yesan-gun (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 250 days.

(21) Appl. No.: 18/210,385

(22) Filed: Jun. 15, 2023

(65) Prior Publication Data

US 2024/0100960 A1     Mar. 28, 2024

(30) Foreign Application Priority Data

Sep. 27, 2022   (KR) .................. 10-2022-0122383

(51) Int. Cl.
*G06F 17/00*     (2019.01)
*B60L 15/20*     (2006.01)
*B60L 50/60*     (2019.01)

(52) U.S. Cl.
CPC ............ *B60L 15/20* (2013.01); *B60L 50/60* (2019.02); *B60L 2240/12* (2013.01);
(Continued)

(58) Field of Classification Search
CPC ...... B60L 15/20; B60L 50/60; B60L 2240/12; B60L 2240/421; B60L 2240/423;
(Continued)

(56) References Cited

U.S. PATENT DOCUMENTS 7,631,710 B2 * 12/2009 Utsumi .................. F02D 29/02
                                                      340/3.1
8,712,620 B2    4/2014 Jackson
(Continued)

FOREIGN PATENT DOCUMENTS

CN      111002974 A    4/2020
CN      109747626 B    9/2020
(Continued)

OTHER PUBLICATIONS

Renewable and Sustainable Energy Reviews (Year: 2018).*
Renewable and Sustainable Energy Reviews (Year: 2018) (Year: 2018).*

*Primary Examiner* — Ronnie M Mancho
(74) *Attorney, Agent, or Firm* — Lempia Summerfield Katz LLC

(57) ABSTRACT

A vehicle includes a battery, a first motor configured to provide a first wheel and a second wheel with a driving force, and a second motor configured to provide the first wheel and the second wheel with different rotational forces. The vehicle also includes a controller configured to output a first torque command and a second torque command, a first motor driver and a second motor driver configured to convert power output from the battery in response to, respectively, the first torque command for the first motor and the second torque command for the second motor. The controller is configured to determine a torque limit of the first motor based on a state of charge (SoC) of the battery (Continued)

and a rotational speed of the first motor and a torque limit of the second motor based on the SoC of the battery and a rotational speed of the second motor.

18 Claims, 9 Drawing Sheets

(52) U.S. Cl.
CPC ... *B60L 2240/421* (2013.01); *B60L 2240/423* (2013.01); *B60L 2240/425* (2013.01); *B60L 2240/429* (2013.01); *B60L 2240/54* (2013.01); *B60L 2240/662* (2013.01); *B60L 2250/26* (2013.01)

(58) Field of Classification Search
CPC ......... B60L 2240/425; B60L 2240/429; B60L 2240/54; B60L 2240/662; B60L 2250/26; B60L 15/2036; B60L 3/12; B60K 7/0007; B60Y 2200/91; B60Y 2300/02; Y02T 10/64; Y02T 10/72

USPC .......................................................... 701/22
See application file for complete search history.

(56) References Cited

U.S. PATENT DOCUMENTS

| | | | |
|---|---|---|---|
| 8,736,218 B2 | 5/2014 | Matsuyama | |
| 10,532,745 B2* | 1/2020 | Kitagawa | B60L 15/2036 |
| 10,632,830 B2 | 4/2020 | Sugizaki et al. | |
| 2017/0232866 A1 | 8/2017 | Sugizaki et al. | |
| 2018/0257651 A1* | 9/2018 | Kitagawa | B60W 30/188 |
| 2020/0324658 A1* | 10/2020 | Borud | B60K 6/442 |
| 2024/0100960 A1* | 3/2024 | Yun | B60L 50/60 |

FOREIGN PATENT DOCUMENTS

| | | | | |
|---|---|---|---|---|
| JP | 2013129299 A | | 7/2013 | |
| JP | 6286458 B2 | | 2/2018 | |
| JP | 2018148755 A | * | 9/2018 | ............... B60K 6/52 |
| KR | 20130138383 A | | 12/2013 | |
| KR | 101535744 B1 | | 7/2015 | |
| KR | 20180068463 A | | 6/2018 | |

\* cited by examiner

VEHICLE AND CONTROL METHOD THEREOF

CROSS-REFERENCE TO RELATED APPLICATION

This application claims the benefit of and priority under 35 U.S.C. § 119 to Korean Patent Application No. 10-2022-0122383, filed on Sep. 27, 2022, in the Korean Intellectual Property Office, the entire disclosure of which is incorporated herein by reference.

TECHNICAL FIELD

The present disclosure relates to a vehicle performing torque vectoring control and a control method thereof.

BACKGROUND

In general, vehicles are a means of transportation driving on the road or rail using fossil fuel, electricity, or the like, as a power source.

Recently, a lot of research on electric vehicles using only electricity has been actively conducted. An electric vehicle includes a drive motor as a driving means for moving the vehicle, and a battery as an energy source for moving the vehicle.

SUMMARY

In an electric vehicle, torque vectoring may be applied to ensure stability during driving. For example, when an electric vehicle drives on a curve, driving stability may be secured by differentiating the torque applied to a left wheel and the torque applied to a right wheel.

An aspect of the present disclosure provides a vehicle and a control method thereof that may limit a charge/discharge power of a battery during torque vectoring control.

An aspect of the present disclosure provides a vehicle and a control method thereof that may limit a motoring/generating torque of a motor during torque vectoring control.

Additional embodiments of the present disclosure are set forth in part in the description which follows and, in part, should be apparent from the description, or may be learned by practice of the present disclosure.

According to an embodiment of the present disclosure, a vehicle includes a battery, a first motor configured to provide a first wheel and a second wheel of the vehicle with a driving force of the vehicle, and a second motor configured to provide the first wheel and the second wheel with different rotational forces. The vehicle also includes a controller configured to output a first torque command of the first motor and a second torque command of the second motor. The vehicle further includes a first motor driver configured to convert power output from the battery in response to the first torque command to control a driving current of the first motor and a second motor driver configured to convert power output from the battery in response to the second torque command to control a driving current of the second motor. The controller may be configured to determine a torque limit of the first motor based on a state of charge (SoC) of the battery and a rotational speed of the first motor. The controller may also be configured to determine a torque limit of the second motor based on the SoC of the battery and a rotational speed of the second motor.

The controller may be configured to determine a driver demand torque based on a driving speed of the vehicle and at least one of a pedal value of an accelerator pedal of the vehicle or a pedal value of a brake pedal of the vehicle. The controller may also be configured to determine a demand torque margin based on the driver demand torque, a demand torque according to the driving speed. The controller may further be configured to a demand torque margin factor. The controller may additionally be configured to determine a driver demand torque allowance based on the driver demand torque and the demand torque margin.

The controller may be configured to determine a first charge/discharge torque limit of the first motor based on the rotational speed and a torque of the first motor. The controller may also be configured to determine a second charge/discharge torque limit of the first motor based on a margin factor based on a difference between a temperature of the first motor and an outdoor temperature.

The controller may be configured to determine the first torque command of the first motor based on a minimum value of the driver demand torque allowance, the first charge/discharge torque limit, and the second charge/discharge torque limit.

The controller may be configured to determine a third charge/discharge torque limit of the second motor based on the rotational speed and a torque of the second motor. The controller may also be configured to determine a fourth charge/discharge torque limit of the second motor based on a margin factor based on a difference between a temperature of the second motor and an outdoor temperature. The controller may further be configured to determine a fifth charge/discharge torque limit of the second motor based on a margin factor based on a difference between a temperature of the first motor and the temperature of the second motor.

The controller may be configured to determine the second torque command of the second motor based on a minimum value of the driver demand torque allowance, the third charge/discharge torque limit, the fourth charge/discharge torque limit, and the fifth charge/discharge torque limit.

The controller may be configured to determine a driver demand power based on a driving speed of the vehicle and at least one of a pedal value of an accelerator pedal of the vehicle or a pedal value of a brake pedal of the vehicle. The controller may also be configured to determine a demand power margin based on the driver demand power, a demand power according to the driving speed, and a demand power margin factor, and determine a driver demand power allowance based on the driver demand power and the demand power margin.

The controller may be configured to determine an available power of the battery based on a charge/discharge power of the battery and a power consumption of an electrical load of the vehicle. The controller may also be configured to determine a first charge/discharge power limit of the first motor based on the rotational speed and a torque of the first motor. The controller may further be configured to determine a second charge/discharge power limit of the first motor based on a margin factor based on a difference between a temperature of the first motor and an outdoor temperature.

The controller may be configured to determine the first torque command of the first motor based on a minimum value of the driver demand power allowance, the available power of the battery, the first charge/discharge power limit, and the second charge/discharge power limit.

The controller may be configured to determine an available power of the battery based on a charge/discharge power of the battery and a power consumption of an electrical load of the vehicle. The controller may also be configured to determine a third charge/discharge power limit of the second motor based on the rotational speed and a torque of the second motor. The controller may further be configured to determine a fourth charge/discharge power limit of the second motor based on a margin factor based on a difference between a temperature of the second motor and an outdoor temperature.

The controller may be configured to determine the second torque command of the second motor based on a minimum value of the driver demand power allowance, the available power of the battery, the third charge/discharge power limit, and the fourth charge/discharge power limit.

According to another embodiment of the present disclosure, a control method is provided for a vehicle including a first wheel, a second wheel, a battery, a first motor, and a second motor. The control method includes providing the first wheel and the second wheel with a driving force of the vehicle using the first motor. The control method also includes providing the first wheel and the second wheel with different rotational forces using the second motor. The control method additionally includes determining a torque limit of the first motor based on a state of charge (SoC) of the battery and a rotational speed of the first motor and determining a torque limit of the second motor based on the SoC of the battery and a rotational speed of the second motor. The control method further includes controlling a driving current of the first motor based on the torque limit of the first motor and controlling a driving current of the second motor based on the torque limit of the second motor.

BRIEF DESCRIPTION OF THE DRAWINGS

These and/or other aspects of the present disclosure should become apparent and more readily appreciated from the following description of the embodiments, taken in conjunction with the accompanying drawings in which.

DETAILED DESCRIPTION

Figure 1:
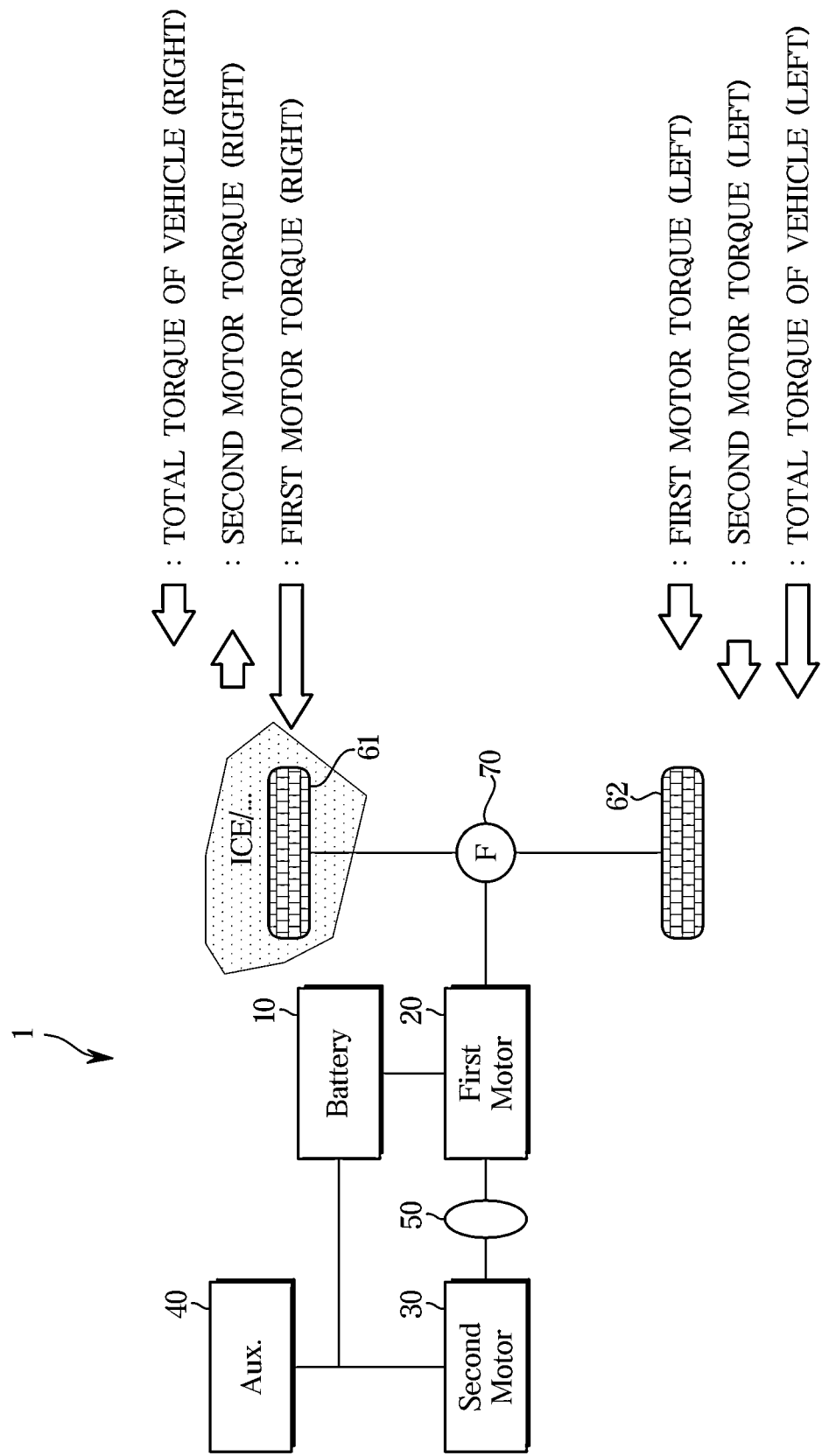
FIG. 1 illustrates an example of a configuration of a mechanism of a vehicle according to an embodiment.

Throughout the specification, like reference numerals denote like elements. The specification does not necessarily describe all elements of various embodiments of the present disclosure. Descriptions of elements or components well-known in the art to which the present disclosure pertains or overlapped portions have been omitted. The terms such as "~part", "~member", "~module", "~block", and the like may refer to at least one process processed by at least one hardware or software. According to embodiments, a plurality of "~parts", "~members", "~modules", "~blocks" may be embodied as a single element, or a single of "~part", "~member", "~module", "~block" may include a plurality of elements.

It should be understood that, when an element is referred to as being "connected" to another element, it can be directly or indirectly connected to the other element. An indirect connection includes "connection" via a wireless communication network.

It should be understood that the term "include," when used in the present specification, specifies the presence of stated features, integers, steps, operations, elements, and/or components, but does not preclude the presence or addition of one or more other features, integers, steps, operations, elements, components, and/or groups thereof.

It should be understood that, when it is stated in the present specification that a member is located "on" another member, the member may be in directly contact with the other member or still another member may be present between the two members.

It should be understood that, although the terms first, second, etc. may be used herein to describe various elements, these elements should not be limited by these terms.

It should be understood that the singular forms are intended to include the plural forms as well unless the context clearly dictates otherwise. When a component, device, element, or the like of the present disclosure is described as having a purpose or performing an operation, function, or the like, the component, device, or element should be considered herein as being "configured to" meet that purpose or perform that operation or function.

Reference numerals used for method steps are used for convenience of explanation, but not to limit an order of the steps. Thus, unless the context clearly dictates otherwise, the written order may be practiced otherwise.

Hereinafter, an operation principle and embodiments of the present disclosure are described in detail with reference to the accompanying drawings.

FIG. 1 illustrates an example configuration of a mechanism of a vehicle according to an embodiment.

As shown in FIG. 1, a vehicle 1 may include a battery 10, a first motor 20, a second motor 30, an auxiliary electrical load 40, and a torque vectoring mechanism 50. The battery 10, the first motor 20, the second motor 30, the auxiliary electrical load 40, and the torque vectoring mechanism 50 are not necessarily essential components of the vehicle 1. One or more of the above constituent components may be omitted.

The battery 10 may store electrical energy. The battery 10 may be electrically connected to the first motor 20, the second motor 30, and the auxiliary electrical load 40.

The battery 10 may be discharged to supply power to the first motor 20, the second motor 30, and/or the auxiliary electrical load 40. The battery 10 may be charged by being supplied with power from the first motor 20 and/or the second motor 30. Additionally or alternatively, the battery 10 may be charged by an external power source.

The first motor 20 may obtain direct current (DC) power from the battery 10 and may provide a first torque for driving the vehicle 1 to wheels 61 and 62 of the vehicle 1.

The first motor 20 may include a stator fixed to the vehicle 1 and a rotor rotatably provided to the stator. The rotor may be rotated by magnetic interaction between the stator and the rotor.

For example, the rotor may include a permanent magnet and the stator may include coils. An alternating current (AC) power converted by the first motor 20 may be supplied to the coils of the stator, and an AC magnetic field that changes with time may be generated around the coils. The rotor may be rotated by magnetic interaction between the changing magnetic field of the coils and a magnetic field of the permanent magnet.

As another example, the rotor may include a magnetic material and the stator may include coils. An AC magnetic field that changes with time may be generated around the coils due to AC power. The magnetic material may be magnetized by the AC magnetic field of the coils, and the rotor may be rotated by magnetic interaction between the changing magnetic field of the coils and a magnetic field of the magnetized magnetic material.

The first motor 20 may be a three-phase motor including three terminals and three coils. The three terminals and the three coils may be connected by various connection methods. For example, the three coils may be connected by a star connection (or Wye connection) where an end of each of the three coils is connected at one node. As another example, the three coils may be connected by a delta connection where both ends of each of the three coils are connected to different coils. A three-phase terminal of the first motor 20 may include an A-phase terminal, a B-phase terminal and a C-phase terminal.

The second motor 30 may obtain a DC current from the battery 10 and may provide a second torque for torque vectoring to the wheels 61 and 62 of the vehicle 1.

The second motor 30 may include a stator fixed to the vehicle 1 and a rotor rotatably provided to the stator. The rotor may be rotated by magnetic interaction between the stator and the rotor.

The second motor 30 may have a configuration identical to or different from that of the first motor 20.

The auxiliary electrical load 40 may include one or more auxiliary devices that enable driving/braking/steering of the vehicle 1 and/or one or more auxiliary devices that provide convenience to a driver of the vehicle 1. For example, the auxiliary electrical load 40 may include one or more of an engine management system (EMS), a transmission control unit (TCU), an electronic brake control module (EBCM), a motor-driven power steering (MDPS), a body control module (BCM), an audio device, a heating/ventilation/air conditioning (HVAC), a navigation device, a power seat, a seat heater, headlights, and the like, or a combination thereof.

The torque vectoring mechanism 50 may distribute the first torque of the first motor 20 and the second torque of the second motor 30 to the right wheel 61 and the left wheel 62 depending on a driving state of the vehicle 1.

The torque vectoring mechanism 50 may consist of a combination of a plurality of planetary gears. The right wheel 61 and the left wheel 62 may be provided with different torques by the torque vectoring mechanism 50.

For example, the vehicle 1 includes a differential gear 70 distributing the first torque of the first motor 20 to the right wheel 61 and the left wheel 62 while the vehicle 1 drives on a curve. The differential gear 70 may distribute different torques to the right wheel 61 and the left wheel 62 for stable driving on a curve.

However, such a function of the differential gear 70 may disturb the driving of the vehicle 1 on a road with a non-uniform friction coefficient.

For example, as shown in FIG. 1, the right wheel 61 may be located on a road surface with a low friction coefficient (e.g. an icy surface) and the left wheel 62 may be located on a road surface with a high friction coefficient (e.g. a normal road surface).

Because of the low friction coefficient of the road surface, spin may occur in the right wheel 61. Accordingly, a rotational speed of the right wheel 61 may be greater than that of the left wheel 62. As such, the differential gear 70 may provide a greater torque to the right wheel 61 than the left wheel 62 due to a difference between the rotational speed of the right wheel 61 and the rotational speed of the left wheel 62. In other words, the torque provided to the right wheel 61 may be greater than the torque provided to the left wheel 62.

As a result, a driving force of the vehicle 1 may decrease and driving stability may deteriorate.

The torque vectoring mechanism 50 may distribute the second torque of the second motor 30 to the right wheel 61 and the left wheel 62 to prevent or curb the deterioration of driving stability.

For example, as shown in FIG. 1, the first torque of the first motor 20 may be unequally distributed to the right wheel 61 and the left wheel 62 by the differential gear 70. In this example, a greater torque may be distributed to the right wheel 61 than to the left wheel 62.

In order to reduce a difference between the torque of the right wheel 61 and the torque of the left wheel 62, the torque vectoring mechanism 50 may distribute the second torque of the second motor 30 to the right wheel 61 and the left wheel 62.

As shown in FIG. 1, a torque in a direction opposite to a torque for driving the vehicle 1 may be distributed to the right wheel 61, and a torque in the same direction as the torque for driving the vehicle 1 may be distributed to the left wheel 62.

Accordingly, a difference between a total torque acting on the right wheel 61 and a total torque acting on the left wheel 62 may be reduced.

As a result, the vehicle 1 may drive stably.

As described above, the vehicle 1 may include the first motor 20 for driving the vehicle and the second motor 30 for stabling the driving of the vehicle. In addition to the first motor 20 and the secondo motor 30, the vehicle 1 may also include the auxiliary electrical load 40 comprising one or more auxiliary devices.

A performance/structure of the auxiliary electrical load 40 may vary depending on a type of the vehicle. In order to overcome the performance/structural difference and stably operate the first motor 20 and the second motor 30, power of the battery 10 and torques of the first motor 20 and the second motor 30 may be adaptively distributed.

Figure 2:
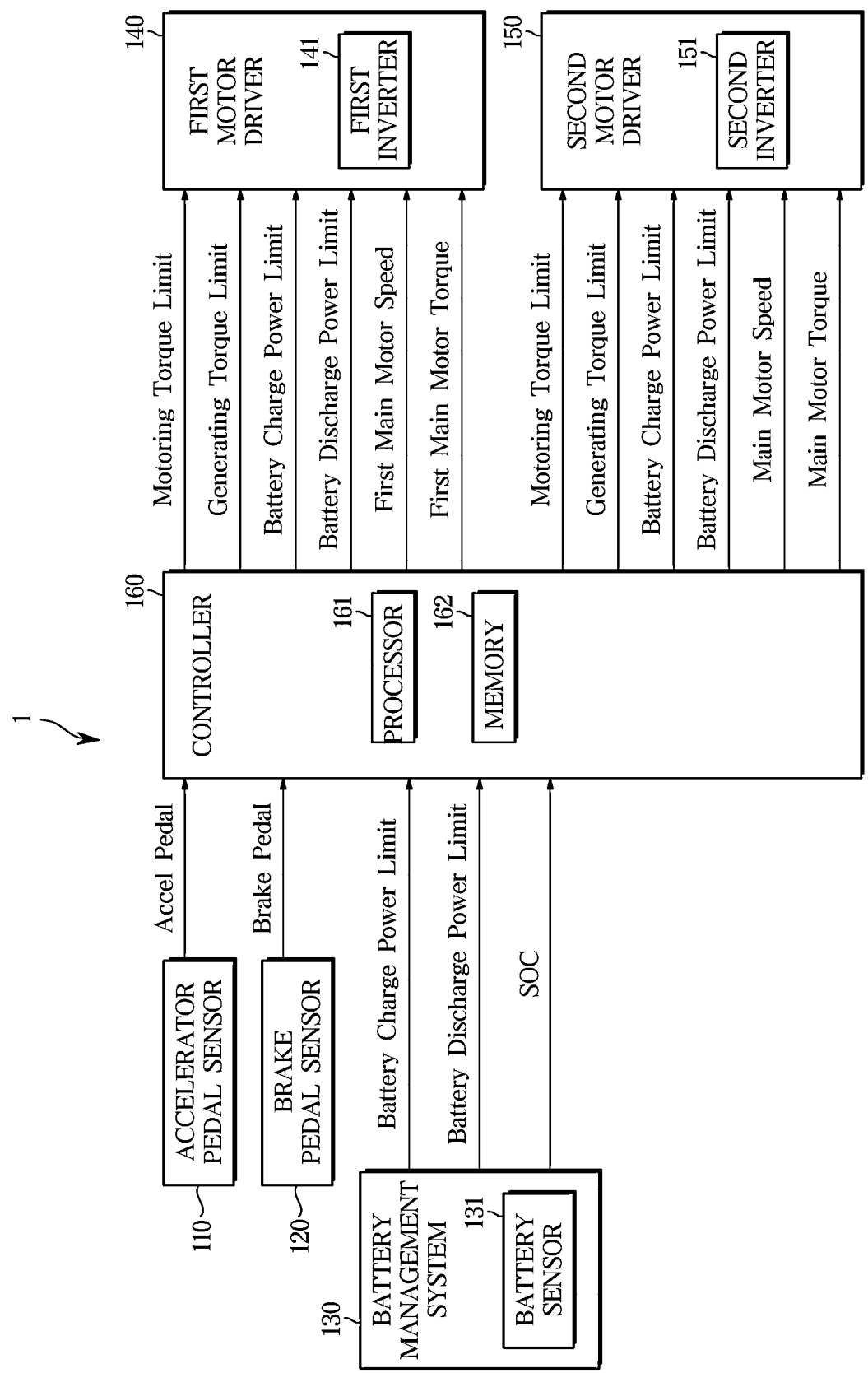
FIG. 2 illustrates an example of a control configuration of a vehicle according to an embodiment.
Figure 3:
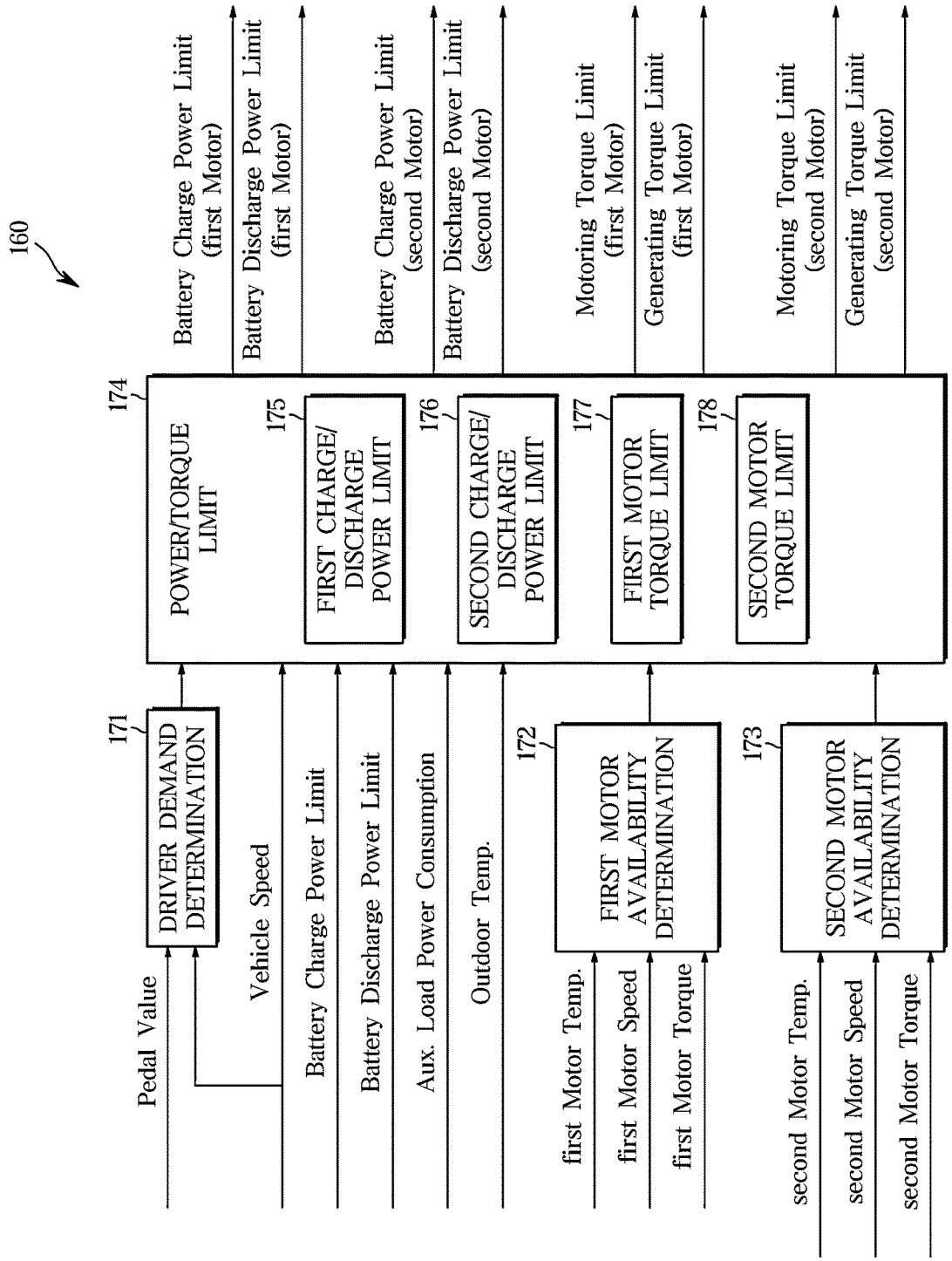
FIG. 3 illustrates a controller included in a vehicle according to an embodiment.

FIG. 2 illustrates an example of a control configuration of a vehicle, according to an embodiment. FIG. 3 illustrates a controller included in a vehicle, according to an embodiment.

The vehicle 1 may include an accelerator pedal sensor 110, a brake pedal sensor 120, a battery management system 130, a first motor driver 140, a second motor driver 150, and a controller 160. The accelerator pedal sensor 110, the brake pedal sensor 120, the battery management system 130, the first motor driver 140, the second motor driver 150, and the controller 160 are not necessarily essential components of the vehicle 1. One or more of the above constituent components may be omitted.

The accelerator pedal sensor 110 may be installed close to an accelerator pedal. The accelerator pedal sensor 110 may detect a movement of the accelerator pedal according to a driver's acceleration intention. For example, the accelerator pedal sensor 110 may measure a movement distance and/or a movement speed, and the like, of the accelerator pedal from a reference position of the accelerator pedal.

The accelerator pedal sensor 110 may be electrically connected to the controller 160 and may provide an electrical signal to the controller 160. In various examples, the accelerator pedal sensor 110 and the controller 160 may be directly connected to each other through a hard wire, or connected over a communication network. The accelerator pedal sensor 110 may provide the controller 160 with an electrical signal (Accel Pedal) corresponding to the movement distance and/or the movement speed of the accelerator pedal.

The brake pedal sensor 120 may be installed close to a brake pedal. The brake pedal sensor 120 may detect a movement of the brake pedal according to a driver's braking intention. For example, the brake pedal sensor 120 may measure a movement distance and/or a movement speed, and the like, of the brake pedal from a reference position of the brake pedal.

The brake pedal sensor 120 may be electrically connected to the controller 160 and may provide an electrical signal to the controller 160. In various examples, the brake pedal sensor 120 and the controller 160 may be directly connected to each other through a hard wire, or connected over a communication network. The brake pedal sensor 120 may provide the controller 160 with an electrical signal (Brake Pedal) corresponding to the movement distance and/or the movement speed of the brake pedal.

The battery management system 130 may include a battery sensor 131.

The battery sensor 131 may detect an output (an output voltage, an output current, and the like) of the battery 10. The battery sensor 131 may output battery data indicating a charging state of the battery 10. For example, the battery sensor 131 may determine a state of charge (SoC) of the battery 10 based on an output voltage, an output current, a temperature, and the like, of the battery 10. The SoC of the battery 10 may indicate the amount of electrical energy stored in the battery 10. In general, the SoC has a value of 0 to 100% that may represent a degree to which the battery 10 is charged between a deep discharge state (0%) and a full charge state (100%). The SoC of the battery 10 may be calculated based on an open circuit voltage (OCV) of the battery 10 and an input/output current of the battery 10.

The battery management system 130 may identify a discharge power limit and a charge power limit based on an output of the battery sensor 131. For example, based on the output voltage, the output current, and/or the temperature of the battery 10, the battery management system 130 may identify a battery charge power limit for limiting a charge power of the battery 10 by regenerative braking and a battery discharge power limit for limiting a discharge power of the battery 10 by motor driving.

The battery management system 130 may be electrically connected to the controller 160. The battery management system 130 may provide the controller 160 with the SoC, the battery charge power limit and the battery discharge power limit.

The first motor driver 140 may apply a driving voltage to the first motor 20 and may supply a driving current to the first motor 20. In an example, the first motor driver 140 may control the driving current supplied to the first motor 20 from the battery 10.

The first motor driver 140 may be electrically connected to the controller 160 and the battery 10. The first motor driver 140 may obtain DC power from the battery 10 and may convert the DC power into AC power according to a control signal of the controller 160. The first motor driver 140 may provide the converted AC power to the first motor 20.

The first motor driver 140 may include a first inverter 141 for converting the DC power to the AC power. The first inverter 141 may include a plurality of switch elements for controlling current flowing through the first motor 20. The plurality of switch elements included in the first inverter 141 may convert the DC power of the battery 10 to AC power according to a control signal of the controller 160.

The first motor driver 140 may receive various control signals for driving the first motor 20 from the controller 160. For example, the first motor driver 140 may obtain, from the controller 160, a motoring torque limit that limits a torque for driving the first motor 20, a generating torque limit that limits a torque by regenerative braking of the first motor 20, the battery charge power limit that limits battery charging by regenerative braking of the first motor 20, and the battery discharge power limit that limits battery discharging by the driving of the first motor 20.

The first motor driver 140 may limit a driving current to limit a torque of the first motor 20 based on the motoring torque limit and the battery discharge power limit. Additionally or alternatively, the first motor driver 140 may limit a braking current by regenerative braking of the first motor 20 based on the generating torque limit and the battery charge power limit.

The first motor driver 140 may provide the controller 160 with information about the driving of the first motor 20. For example, the first motor driver 140 may provide the controller 160 with a rotational speed of the first motor 20 (first motor speed) and the torque of the first motor 20 (first motor torque).

The second motor driver 150 may apply a driving voltage to the second motor 30 and may supply a driving current to the second motor 30. The second motor driver 150 may control the driving current supplied to the second motor 30 from the battery 10.

The second motor driver 150 may be electrically connected to the controller 160 and the battery 10. The second motor driver 150 may obtain DC power from the battery 10 and may convert the DC power to AC power according to a control signal of the controller 160. The second motor driver 150 may provide the converted AC power to the second motor 30.

The second motor driver 150 may include a second inverter 151 for converting DC power to AC power. The second inverter 151 may include a plurality of switch elements for controlling current flowing through the second motor 30. The plurality of switch elements included in the second inverter 151 may convert DC power obtained from the battery 10 to AC power according to a control signal of the controller 160.

The second motor driver 150 may receive, from the controller 160, various control signals for driving the second motor 30. For example, the second motor driver 150 may obtain, from the controller 160, a motoring torque limit that limits a torque for driving the second motor 30, a generating torque limit that limits a torque by regenerative braking of the second motor 30, a battery charge power limit that limits battery charging by regenerative braking of the second motor 30, and a battery discharge power limit that limits battery discharging by the driving of the second motor 30.

The second motor driver 150 may limit a driving current to limit a torque of the second motor 30 based on the motoring torque limit and the battery discharge power limit.

Additionally or alternatively, the second motor driver 150 may limit a braking current by regenerative braking of the second motor 30 based on the generating torque limit and the battery charge power limit.

The second motor driver 150 may provide the controller 160 with information about the driving of the second motor 30. For example, the second motor driver 150 may provide the controller 160 with a rotational speed of the second motor 30 (second motor speed) and the torque of the second motor 30 (second motor torque).

The controller 160 may be electrically connected to the battery management system 130, the first motor driver 140, and the second motor driver 150.

The controller 160 may calculate a driver's demand torque (demand torque). The controller 160 may determine charge/discharge power limit of the first motor 20 and the second motor 30 by considering operations of the battery 10 and the auxiliary electrical load 40. The controller 160 may determine motoring/generating torque limits of the first motor 20 and the second motor 30 by considering operations of the first motor 20 and the second motor 30. Additionally or alternatively, the controller 160 may provide a torque command based on a demand torque within a range of the power limit and the torque limit.

The controller 160 may distribute and limit power of the auxiliary electrical load 40 to a charge/discharge power limit value of the battery 10.

For driving of the first motor 20, the controller 160 may distribute power of the battery 10 based on a driver's demand power (demand power) and a predictive value of change in the demand power. The controller 160 may limit a driving power of the first motor 20 by charge/discharge power of the battery 10 except for the auxiliary electrical load 40. The controller 160 may limit a driving power of the first motor 20 by charge/discharge power of the first motor 20. Additionally or alternatively, the controller 160 may limit the driving power of the first motor 20 by a derating factor correcting a difference between a temperature of the first motor 20 and an outdoor temperature.

For driving of the second motor 30, the controller 160 may distribute a remaining power of the battery 10 based on power by torque vectoring after the driving power of the first motor 20 is distributed and limited and a predictive value of change in the power. The controller 160 may limit a driving power of the second motor 30 based on a difference between the driving power of the first motor 20 and the driving power of the second motor 30. The controller 160 may limit the driving power of the second motor 30 by the charge/discharge power of the battery 10 except for the auxiliary electrical load 40. The controller 160 may limit the driving power of the second motor 30 by a charge/discharge power of the second motor 30. The controller 160 may limit the driving power of the second motor 30 by a derating factor correcting a difference between a temperature of the second motor 30 and an outdoor temperature. Additionally or alternatively, the controller 160 may limit the driving power of the second motor 30 based on an SoC of the battery 10.

For example, the controller 160 may provide a control signal for controlling the first motor 20 and the second motor 30 to the first motor driver 140 and the second motor driver 150, respectively. The control signal may be generated based on output signals of the battery management system 130, the first motor driver 140 and the second motor driver 150.

In an example, the controller 160 may obtain the battery charge power limit, the battery discharge power limit, the SoC, the rotational speed of the first motor 20 (first motor speed), the torque of the first motor 20 (first motor torque), the rotational speed of the second motor 30 (second motor speed), and the torque of the second motor 30 (second motor torque). Based on one or more of the received signals, the controller 160 may provide the first motor driver 140 and the second motor driver 150 with the motoring torque limit, the generating torque limit, the battery charge power limit, and the battery discharge power limit.

The controller 160 may include a processor 161 configured to process the output signals of the battery management system 130, the first motor driver 140 and the second motor driver 150, and a memory 162 for storing data and/or a program for processing the output signals of the battery management system 130, the first motor driver 140 and the second motor driver 150. The processor 161 and the memory 162 may be implemented as separate semiconductor devices or a single semiconductor device. The controller 160 may include a plurality of processors and/or a plurality of memories.

The memory 162 may include a volatile memory such as a static random access memory (S-RAM), a dynamic random access memory (D-RAM), and the like, and/or a non-volatile memory such as a read only memory (ROM), an erasable programmable read only memory (EPROM), and the like. The memory 162 may include a single memory device or a plurality of memory devices.

The processor 161 may include a microprocessor, a microcontroller, an application specific integrated circuit (ASIC), and/or a field-programmable gate array (FPGA). The processor 161 may include a single processor or a plurality of processors.

As shown in FIG. 3, the controller 160 may include a driver demand determination 171, a first motor availability determination 172, a second motor availability determination 173, and a power/torque limit 174, for example.

The driver demand determination 171 may determine a driver's demand torque indicating a torque corresponding to a driver request for the vehicle 1.

For example, the driver demand determination 171 may obtain a driving speed of the vehicle 1 (vehicle speed) and a pedal value of the accelerator pedal sensor 110 or the brake pedal sensor 120 (pedal value). The driver demand determination 171 may calculate a driver's demand torque (demand torque) based on the obtained pedal value and vehicle speed.

The first motor availability determination 172 may determine available power and available torque of the first motor 20 indicating power and torque allowable for the first motor 20.

For example, the first motor availability determination 172 may obtain a temperature of the first motor 20 (first motor temp), the rotational speed of the first motor 20 (first motor speed), and the torque of the first motor 20 (first motor torque). The first motor availability determination 172 may calculate a limit of the available power of the first motor 20 and a limit of the available torque of the first motor 20 based on the obtained values.

The second motor availability determination 173 may determine available power and available torque of the second motor 30 indicating power and torque allowable for the second motor 30.

For example, the second motor availability determination 173 may obtain a temperature of the second motor 30 (second motor temp), the rotational speed of the second motor 30 (second motor speed), and the torque of the second motor 30 (second motor torque). The second motor availability determination 173 may calculate a limit of the available power of the second motor 30 and a limit of the available torque of the second motor 30 based on the obtained values.

The power/torque limit 174 may determine the motoring/generating torque limits and the battery charge/discharge power limits of the first motor 20 and the second motor 30.

For example, the power/torque limit 174 may obtain the demand torque, the vehicle speed of the vehicle 1, the battery charge power limit, the battery discharge power limit, a power consumption of the auxiliary electrical load 40 (load power consumption), and an outdoor temperature. Based on the obtained values, the power/torque limit 174 may calculate the battery charge/discharge power limit of the first motor 20, the battery charge/discharge power limit of the second motor 30, the motoring/generating torque limit of the first motor 20 and the motoring/generating torque limit of the second motor 30.

The power/torque limit 174 may include a first charge/discharge power limit 175 configured to calculate the battery charge/discharge power limit of the first motor 20. The power/torque limit 174 may also include a second charge/discharge power limit 176 configured to calculate the battery charge/discharge power limit of the second motor 30. The power/torque limit 174 may further include a first motor torque limit 177 configured to calculate the motoring/generating torque limit of the first motor 20 and a second motor torque limit 178 configured to calculate the motoring/generating torque limit of the second motor 30.

As described above, each of the first motor driver 140 and the second motor driver 150 may limit a driving current to limit the torque of the first motor 20 and the second motor 30 based on the motoring torque limit and the battery discharge power limit. Additionally or alternatively, each of the first motor driver 140 and the second motor driver 150 may limit a braking current by regenerative braking of the first motor 20 and the second motor 30 based on the generating torque limit and the battery charge power limit.

Figure 4:
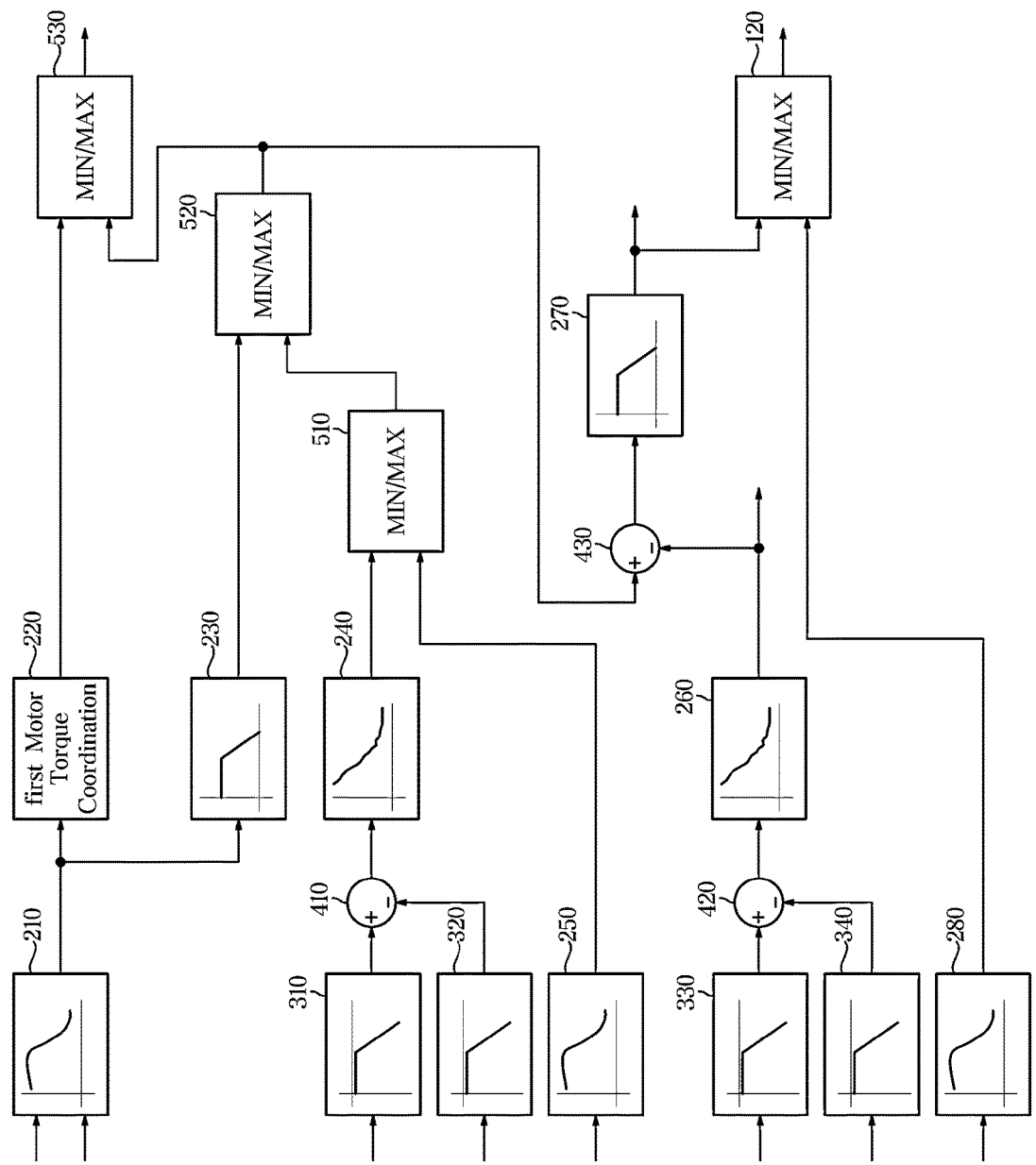
FIG. 4 illustrates an example of a controller included in a vehicle according to an embodiment.

FIG. 4 illustrates an example of a controller included in a vehicle, according to an embodiment.

As shown in FIG. 4, the controller 160 may include a plurality of mapping units, a plurality of filters, a plurality of calculators and a plurality of comparators. The constituent components shown in FIG. 4 are not necessarily essential components of the controller 160. One or more of the above constituent components may be omitted.

A first mapping unit 210 may output a driver's demand torque (demand torque) corresponding to a pedal value and a driving speed of the vehicle (vehicle speed) by referring to a first mapping table.

A second mapping unit 220 may output a first motor torque request corresponding to the demand torque by referring to a second mapping table.

A third mapping unit 230 may output a margin factor corresponding to a driver's demand power (demand power) by referring to a third mapping table.

A first filter 310 may filter an outdoor temperature.

A second filter 320 may filter a first motor temperature.

A first calculator 410 may output a difference between the filtered outdoor temperature and the filtered first motor temperature.

A fourth mapping unit 240 may output a first motor torque derating factor corresponding to the difference between the filtered outdoor temperature and the filtered first motor temperature by referring to a fourth mapping table.

A fifth mapping unit 250 may output a first motor motoring/generating torque derating factor corresponding to a rotational speed of the first motor 20 (first motor speed) by referring to a fifth mapping table.

A first comparator 510 may compare the first motor torque derating factor and the first motor motoring/generating torque derating factor and may output a minimum value according to a result of the comparison.

A second comparator 520 may compare the margin factor and an output of the first comparator 510 and may output a minimum value according to a result of the comparison. For example, the second comparator 520 may output a minimum value among the margin factor, the first motor torque derating factor, and the first motor motoring/generating torque derating factor.

A third comparator 530 may compare the first motor torque request and an output of the second comparator 520 and may output a first motor torque command corresponding to a minimum value according to a result of the comparison. For example, the first motor torque command may correspond to a minimum value among the first motor torque request, the margin factor, the first motor torque derating factor and the first motor motoring/generating torque derating factor.

A third filter 330 may filter an outdoor temperature.

A fourth filter 340 may filter a second motor temperature.

A second calculator 420 may output a difference between the filtered outdoor temperature and the filtered second motor temperature.

A sixth mapping unit 260 may output a second motor torque derating factor corresponding to the difference between the filtered outdoor temperature and the filtered second motor temperature by referring to a sixth mapping table.

A third calculator 430 may calculate a difference between the output of the second comparator 520 and the second motor torque derating factor. For example, the third calculator 430 may calculate a difference between the second motor torque derating factor and the minimum value among the margin factor, the first motor torque derating factor and the first motor motoring/generating torque derating factor.

A seventh mapping unit 270 may calculate the second motor torque derating factor corresponding to an output of the third calculator 430 by referring to a seventh mapping table. For example, the seventh mapping unit 270 may calculate the second motor torque derating factor corresponding to a difference between the output of the second comparator 520 and the second motor torque derating factor.

An eighth mapping unit 280 may output a second motor motoring/generating torque derating factor corresponding to a rotational speed of the second motor 30 (second motor speed) by referring to an eighth mapping table.

A fourth comparator 540 may compare an output of the seventh mapping unit 270 and an output of the eighth mapping unit 280 and may output a second motor torque command corresponding to a minimum value according to a result of the comparison. For example, the second motor torque command may correspond to a minimum value between the second motor torque derating factor and the second motor motoring/generating torque derating factor.

Figure 5:
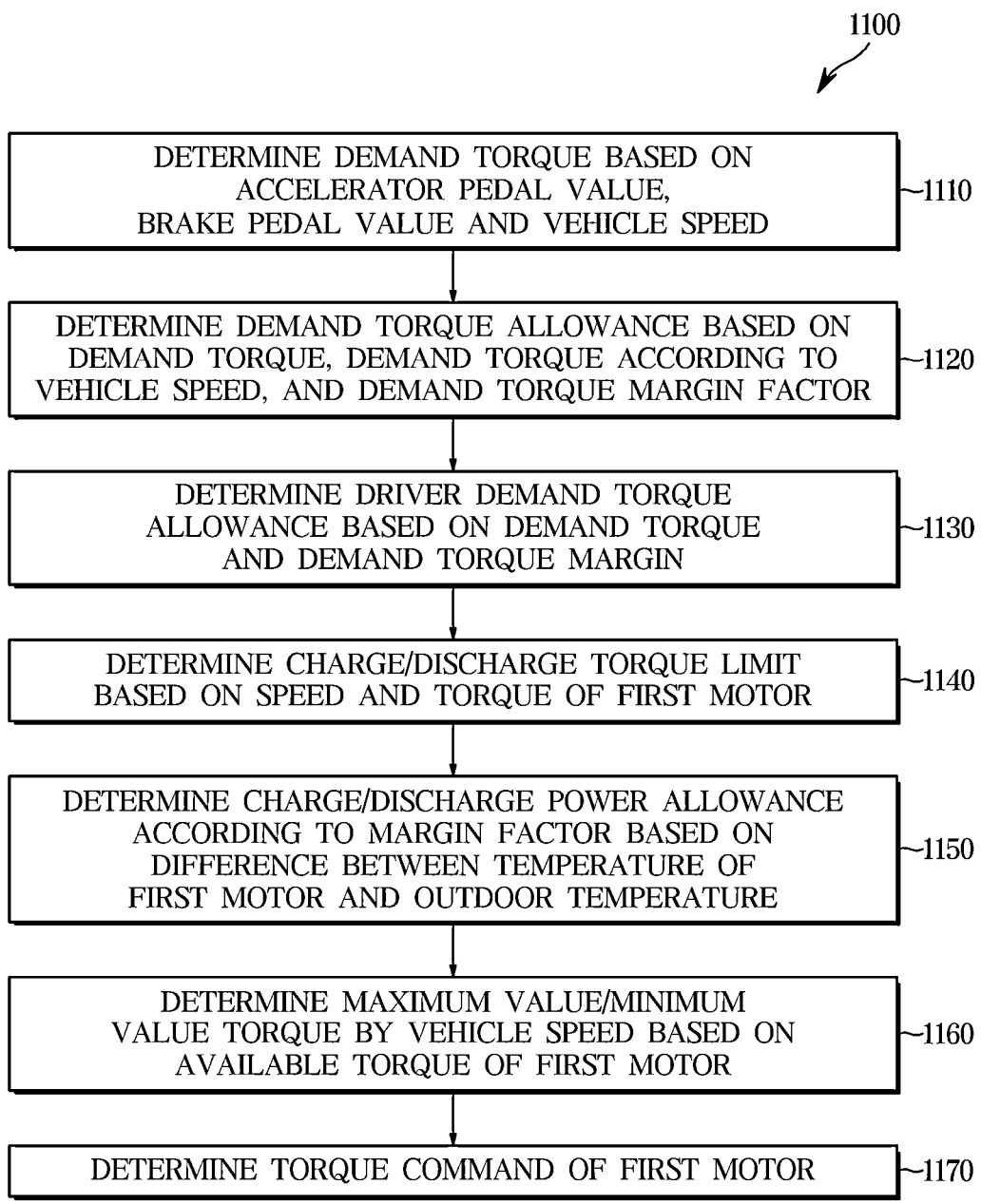
FIG. 5 illustrates a method for determining a torque command of a first motor by a controller of a vehicle according to an embodiment.

FIG. 5 illustrates a method 1100 for determining a torque command of a first motor by a controller of a vehicle, according to an embodiment.

In an operation 1110, the vehicle 1 may determine a demand torque of a driver.

The controller 160 may determine the demand torque based on a pedal value of the accelerator pedal sensor 110, a pedal value of the brake pedal sensor 120 and a driving speed (vehicle speed) of the vehicle 1 that is currently travelling.

In an operation 1120, the vehicle 1 may determine a demand torque margin based on the demand torque, a demand torque according to the vehicle speed, and a demand torque margin factor.

The controller 160 may calculate a demand torque allowance, i.e., the demand torque margin. A demand torque predictive value may correspond to a value obtained by adding a demand torque increase margin to a value obtained by multiplying a difference between a previous demand torque and a current demand torque by a change prediction factor of demand torque.

In an operation 1130, the vehicle 1 may determine a driver demand torque allowance based on the demand torque and the demand torque margin.

The controller 160 may calculate the driver demand torque allowance, i.e., a driver available torque, based on the demand torque determined in operation 1110 and the demand torque allowance determined in operation 1120. The driver available torque may correspond to a difference between an available torque of the battery 10 and the demand torque predictive value.

In an operation 1140, the vehicle 1 may determine a charge/discharge torque limit of the first motor 20 based on a rotational speed and a torque of the first motor 20.

The controller 160 may calculate the charge/discharge torque limit of the first motor 20. A charge/discharge torque of the first motor 20 may be equal to an available torque of the first motor 20.

In an operation 1150, the vehicle 1 may determine a charge/discharge power allowance of the first motor 20 according to a margin factor based on a difference between a temperature of the first motor 20 and an outdoor temperature.

The controller 160 may calculate the charge/discharge power allowance of the first motor 20. An available power of the first motor 20 may be determined by multiplying the available torque of the first motor 20 by an available power margin factor of the first motor 20 according to the temperature of the first motor 20 and the outdoor temperature.

In an operation 1160, the vehicle 1 may determine a maximum value/minimum value torque by vehicle speed, based on the available torque of the first motor 20.

The controller 160 may determine a maximum value and a minimum value of the driver demand torque allowance determined in the operation 1130, the charge/discharge torque limit of the first motor 20 determined in the operation 1140, and the charge/discharge power allowance of the first motor 20 determined in the operation 1150.

In operation 1170, the vehicle 1 may determine a torque command of the first motor 20 (1170).

The controller 160 may determine the torque command of the first motor 20 based on the maximum value and the minimum value of the driver demand torque allowance, the charge/discharge torque limit of the first motor 20, and the charge/discharge power allowance of the first motor 20.

Figure 6:
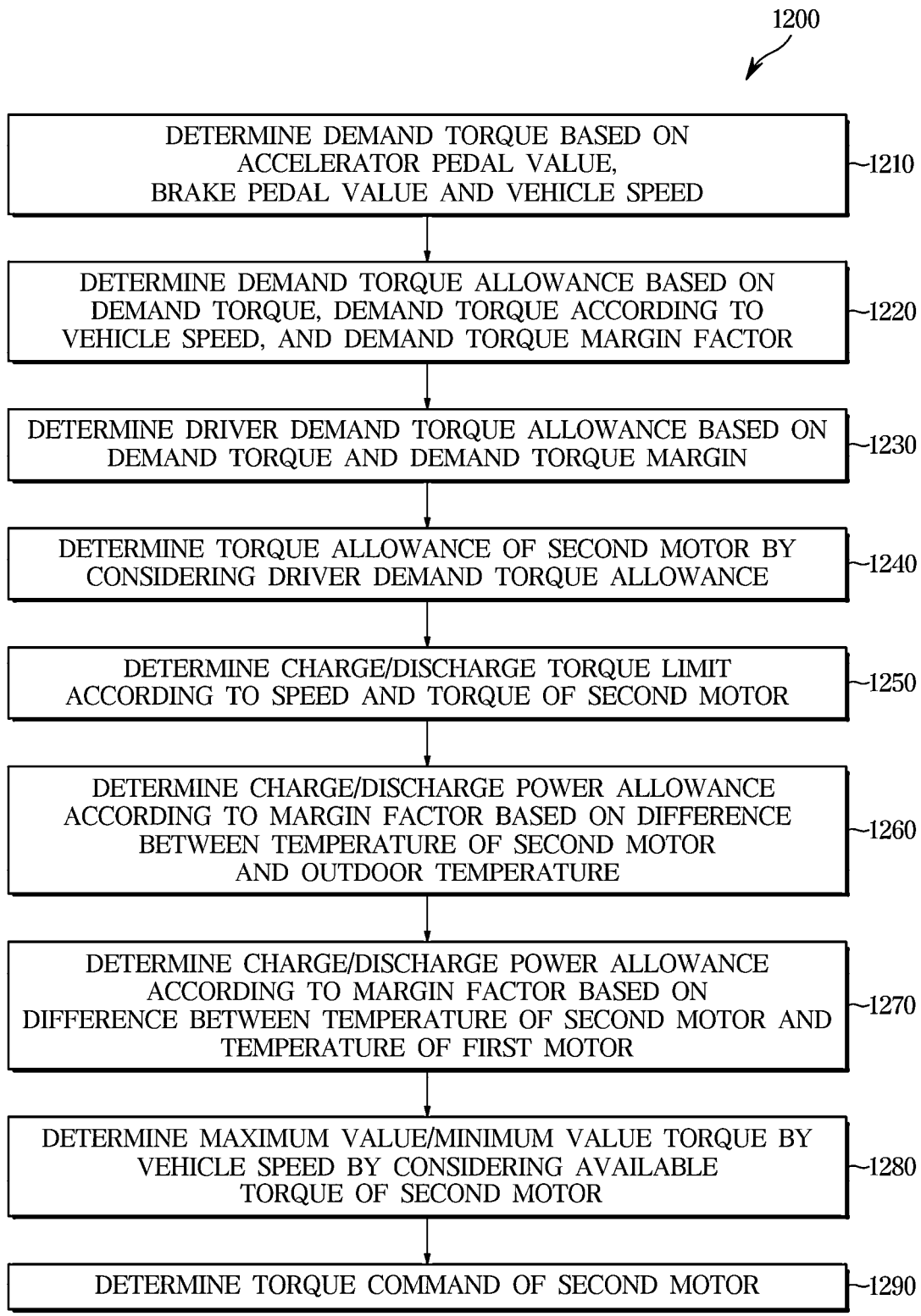
FIG. 6 illustrates a method for determining a torque command of a second motor by a controller of a vehicle according to an embodiment.

FIG. 6 illustrates a method 1200 for determining a torque command of a second motor by a controller of a vehicle, according to an embodiment.

In operation 1210, the vehicle 1 may determine a demand torque of a driver. In operation 1220, the vehicle 1 may determine a demand torque allowance based on the demand torque, a demand torque according to a vehicle speed, and a demand torque margin factor in the vehicle 1 that is currently travelling.

The operations 1210 and 1220 may be the same as the operations 1110 and 1120 illustrated in FIG. 5, respectively.

In an operation 1230, the vehicle 1 may determine a driver demand torque allowance based on the demand torque and the demand torque margin factor.

The controller 160 may calculate the driver demand torque allowance, i.e., a driver available torque, based on the demand torque determined in the operation 1210 and the demand torque allowance determined in the operation 1220. The driver available torque may correspond to a difference between an available torque of the battery 10 and a demand torque predictive value.

In an operation 1240, the vehicle 1 may determine a torque allowance of the second motor 30 by considering the driver demand torque allowance.

The controller 160 may calculate the torque allowance of the second motor 30, i.e., an available torque of the second motor 30. The available torque of the second motor 30 may correspond to a difference between an available torque of the first motor 20 and the driver available torque.

In an operation 1250, the vehicle 1 may determine a charge/discharge torque limit of the second motor 30 according to a rotational speed and a torque of the second motor 30.

The controller 160 may calculate a charge/discharge torque of the second motor 30. The charge/discharge torque of the second motor 30 may be equal to the available torque of the second motor 30.

In an operation 1260, the vehicle 1 may determine a charge/discharge power allowance of the second motor 30 according to a margin factor based on a difference between a temperature of the second motor 30 and an outdoor temperature.

The controller 160 may calculate the charge/discharge power allowance of the second motor 30, i.e., an available power of the second motor 30. The available power of the second motor 30 may be determined by multiplying the available torque of the second motor 30 by an available power margin factor of the second motor 30 according to the temperature of the second motor 30 and the outdoor temperature.

In an operation 1270, the vehicle 1 may determine a charge/discharge power allowance of the second motor 30 according to a margin factor based on a difference between the temperature of the second motor 30 and a temperature of the first motor 20.

The controller 160 may calculate the charge/discharge power allowance of the second motor 30, i.e., the available power of the second motor 30. The available power of the second motor 30 may be determined by multiplying the available torque of the second motor 30 by the available power margin factor of the second motor 30.

In an operation 1280, the vehicle 1 may determine a maximum value/minimum value torque by vehicle speed based on the available torque of the second motor 30.

The controller 160 may determine a maximum value and a minimum value of the driver demand torque allowance determined in the operation 1230, the charge/discharge torque limit of the second motor 30 determined in the operation 1250, the charge/discharge power allowance of the second motor 30 determined in the operation 1260, and the charge/discharge power allowance of the second motor 30 determined in the operation 1270.

In an operation 1290, the vehicle 1 may determine a torque command of the second motor 30.

The controller 160 may determine the torque command of the second motor 30 based on the maximum value and the minimum value of the driver demand torque allowance, the charge/discharge torque limit of the second motor 30, and the charge/discharge power allowance of the second motor 30.

Figure 7:
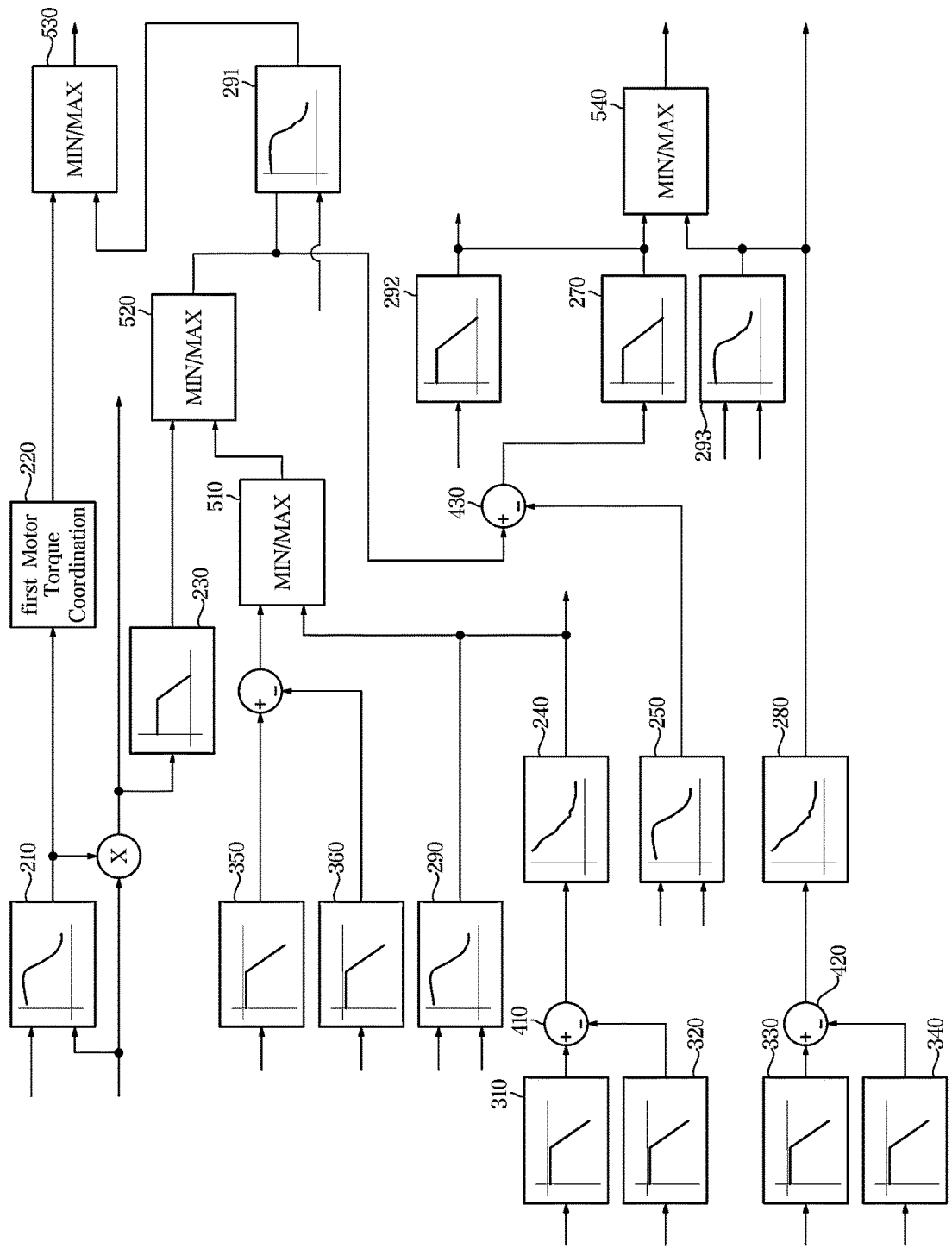
FIG. 7 illustrates another example of a controller included in a vehicle according to an embodiment.

FIG. 7 illustrates another example of a controller included in a vehicle, according to an embodiment.

As shown in FIG. 7, the controller 160 may include a plurality of mapping units, a plurality of filters, a plurality of calculators, and a plurality of comparators. The constituent components shown in FIG. 7 are not necessarily essential components of the controller 160. One or more of the above constituent components may be omitted.

The first mapping unit 210 may output a driver's demand torque (demand torque) corresponding to a pedal value and a driving speed (vehicle speed) of the vehicle by referring to a first mapping table.

The second mapping unit 220 may output a first motor torque request corresponding to the demand torque by referring to a second mapping table.

A fourth calculator 440 may obtain the vehicle speed and the demand torque. The fourth calculator 440 may output a demand power of a driver corresponding to a value obtained by multiplying the vehicle speed and the demand torque.

The third mapping unit 230 may output a margin factor corresponding to the demand power by referring to a third mapping table.

A fifth filter 350 may filter a battery charge power limit and may output the filtered battery charge power limit.

A sixth filter 360 may filter a power consumption of the auxiliary electrical load 40 (load power consumption) and may output the filtered load power consumption.

A fifth calculator 450 may calculate a difference between the filtered battery charge power limit and the filtered load power consumption.

A ninth mapping unit 290 may output a first motor charge/discharge power derating factor corresponding to a rotational speed of the first motor 20 (first motor speed) of the first motor 20 and the first motor torque of the first motor 20 by referring to a ninth mapping table.

The first filter 310 may filter an outdoor temperature.

The second filter 320 may filter a first motor temperature.

The first calculator 410 may output a difference between the filtered outdoor temperature and the filtered first motor temperature.

The fourth mapping unit 240 may output a first motor torque derating factor corresponding to the difference between the filtered outdoor temperature and the filtered first motor temperature by referring to a fourth mapping table.

The first comparator 510 may compare the first motor torque derating factor, the first motor charge/discharge power derating factor, and a first motor motoring/generating torque derating factor and may output a minimum value according to a result of the comparison.

The second comparator 520 may compare the margin factor to an output of the first comparator 510 and may output a minimum value according to a result of the comparison. For example, the second comparator 520 may output a minimum value among the margin factor, the first motor torque derating factor, the first motor charge/discharge power derating factor, and the first motor motoring/generating torque derating factor.

A tenth mapping unit 291 may output an output based on an output of the second comparator 520 and the first motor speed by referring to a tenth mapping table.

The third comparator 530 may compare a first motor torque request and an output of the tenth mapping unit 291 and may output a first motor torque command corresponding to a minimum value according to a result of the comparison.

An eleventh mapping unit 292 may output an auxiliary function consumption power margin factor based on an SoC of the battery 10 by referring to an eleventh mapping table.

A twelfth mapping unit 293 may output a second motor charge/discharge power derating factor of the second motor 30 based on a rotational speed of the second motor 30 (second motor speed) and a torque of the second motor 30 (second motor torque), by referring to a twelfth mapping table.

A six calculator 460 may calculate a difference between the output of the second comparator 520 and an output of the twelfth mapping unit 293. The six calculator 460 may output a difference between the output of the second comparator 520 and the second motor charge/discharge power derating factor.

A thirteenth mapping unit 294 may output a second motor torque derating factor of the second motor 30 by a torque difference between the first motor 20 and the second motor 30, based on an output of the sixth calculator 460, by referring to a thirteenth mapping table.

The third filter 330 may filter an outdoor temperature.

The fourth filter 340 may filter a second motor temperature.

The second calculator 420 may output a difference between the filtered outdoor temperature and the filtered second motor temperature.

The sixth mapping unit 260 may output a second motor torque derating factor corresponding to the difference between the filtered outdoor temperature and the filtered second motor temperature by referring to a sixth mapping table.

The fourth comparator 540 may compare an output of the eleventh mapping unit 292, an output of the thirteenth mapping unit 294, an output of a fourteenth mapping unit 295, and an output of the sixth mapping unit 260 and may output a second motor torque command corresponding to a minimum value according to a result of the comparison.

Figure 8:
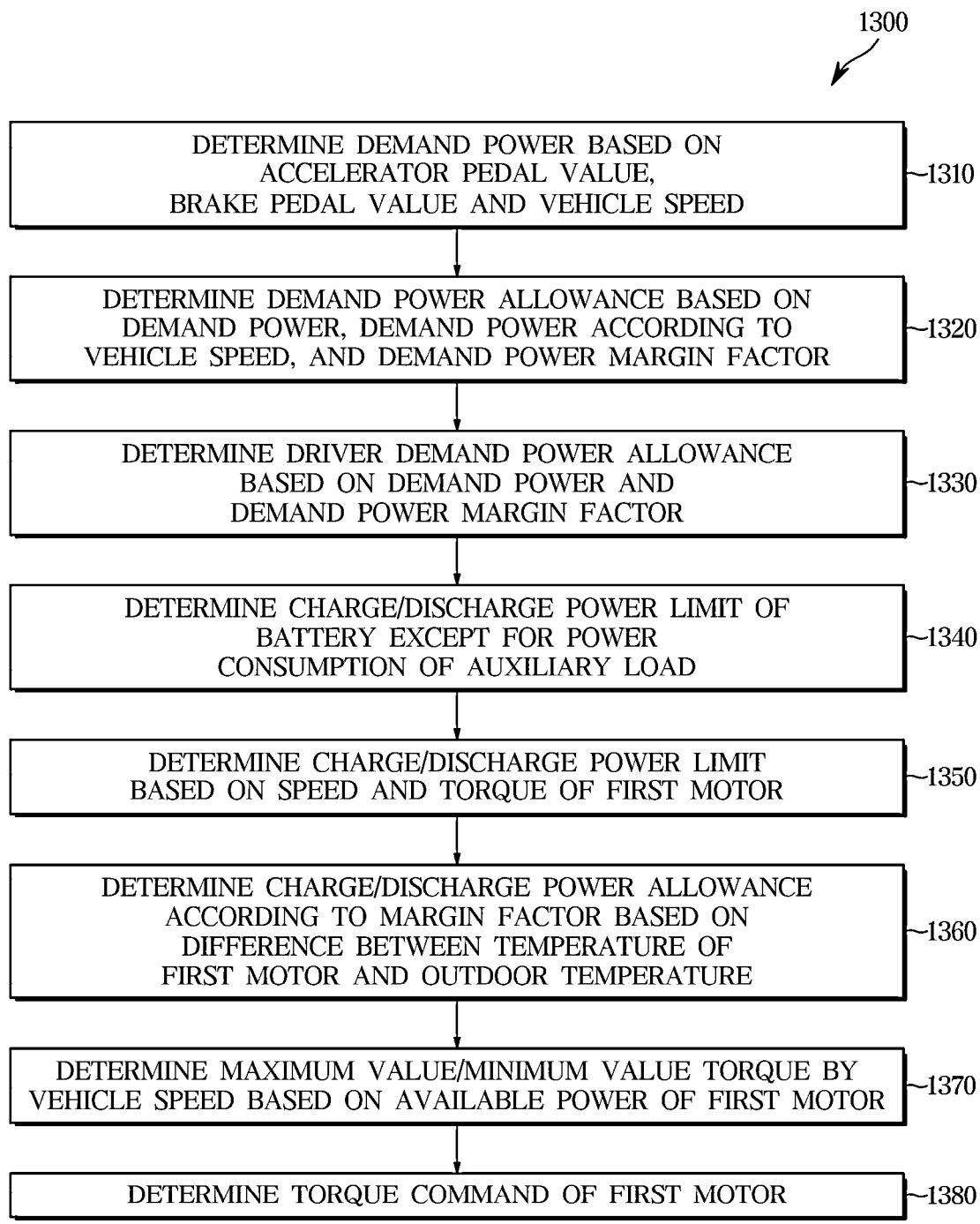
FIG. 8 illustrates a method for determining a torque command of a first motor by a controller of a vehicle according to an embodiment.

FIG. 8 illustrates a method 1300 of determining a torque command of a first motor by a controller of a vehicle according to an embodiment.

In an operation 1310, the vehicle 1 may determine a demand power of a driver.

The controller 160 may determine the demand power based on a pedal value of the accelerator pedal sensor 110, a pedal value of the brake pedal sensor 120 and a driving speed (vehicle speed) of the vehicle 1 that is currently travelling.

In an operation 1320, the vehicle 1 may determine a demand power allowance based on the demand power, a demand power according to the vehicle speed, and a demand power margin factor.

In an operation 1330, the vehicle 1 may determine a driver demand power allowance based on the demand power and the demand power margin factor.

The controller 160 may calculate the driver demand power allowance, i.e., a driver available power, based on the demand power determined in the operation 1310 and a demand power margin determined in the operation 1320. The driver available power may correspond to a difference between an available power of the battery 10 and a demand power predictive value.

In an operation 1340, The vehicle 1 may determine a charge/discharge power limit of the battery 10 except for a power consumption of the auxiliary electrical load 40.

The controller 160 may calculate the charge/discharge power limit of the battery 10, i.e., a battery available power. The battery available power may correspond to a difference between a charge/discharge power of the battery 10 and the power consumption of the auxiliary electrical load 40.

In an operation 1350, the vehicle 1 may determine a charge/discharge power limit of the first motor 20 based on a rotational speed and a torque of the first motor 20.

The controller 160 may calculate the charge/discharge power limit of the first motor 20. A charge/discharge power of the first motor 20 may be equal to an available power of the first motor 20.

In an operation 1360, the vehicle 1 may determine a charge/discharge power allowance of the first motor 20 according to a margin factor based on a difference between a temperature of the first motor 20 and an outdoor temperature.

The controller 160 may calculate the charge/discharge power allowance of the first motor 20. The available power of the first motor 20 may be determined by multiplying an available torque of the first motor 20 by an available power margin factor of the first motor 20 according to the temperature of the first motor 20 and the outdoor temperature.

In an operation 1370, the vehicle 1 may determine a maximum value/minimum value torque by vehicle speed based on the available power of the first motor 20.

The controller 160 may determine a maximum value and a minimum value of the driver demand power allowance determined in the operation 1330, the charge/discharge power limit of the battery 10 determined in the operation 1340, the charge/discharge power limit of the first motor 20 determined in the operation 1350, and the charge/discharge power allowance of the first motor 20 determined in the operation 1360.

In an operation 1380, the vehicle 1 may determine a torque command of the first motor 20.

The controller 160 may determine the torque command of the first motor 20 based on the maximum value and the minimum value of the driver demand torque allowance, the charge/discharge power limit of the battery 10, the charge/discharge power limit of the first motor 20, and the charge/discharge power allowance of the first motor 20.

Figure 9:
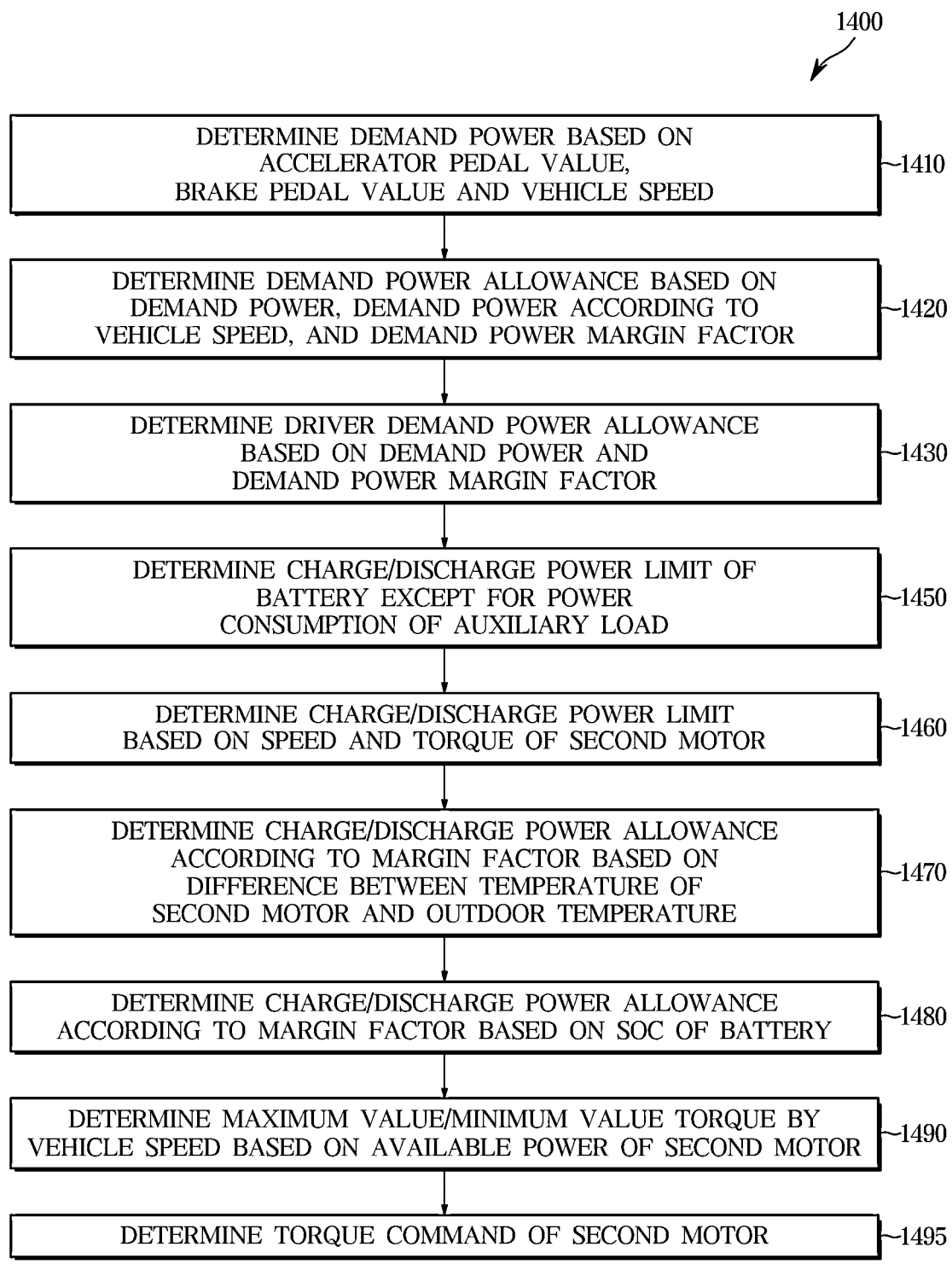
FIG. 9 illustrates a method for determining a torque command of a second motor by a controller of a vehicle according to an embodiment.

FIG. 9 illustrates a method 1400 for determining a torque command of a second motor by a controller of a vehicle, according to an embodiment.

In an operation 1410, the vehicle 1 may determine a demand power of a driver.

In an operation 1420, the vehicle 1 may determine a demand power allowance according to the demand power, a demand power according to a vehicle speed, and a demand power margin factor in the vehicle 1 which is currently travelling. In an operation 1430, the vehicle 1 may determine a driver demand power allowance based on the demand power and the demand power margin factor.

The operations 1410, 1420 and 1430 may be the same as the operations 1310, 1320 and 1330 illustrated in FIG. 8, respectively.

In an operation 1450, the vehicle 1 may determine a charge/discharge power limit of the battery 10 except for a power consumption of the auxiliary electrical load 40.

The controller 160 may calculate the charge/discharge power limit of the battery 10, i.e., a battery available power. The battery available power may correspond to a difference between a charge/discharge power of the battery 10 and the power consumption of the auxiliary electrical load 40.

In an operation 1460, the vehicle 1 may determine a charge/discharge power limit of the second motor 30 based on a rotational speed and a torque of the second motor 30.

The controller 160 may calculate the charge/discharge power limit of the second motor 30. A charge/discharge power of the second motor 30 may be equal to an available power of the second motor 30.

In an operation 1470, the vehicle 1 may determine a charge/discharge power allowance of the second motor 30 according to a margin factor based on a difference between a temperature of the second motor 30 and an outdoor temperature.

The controller 160 may calculate the charge/discharge power allowance of the second motor 30. The available power of the second motor 30 may be determined by multiplying an available torque of the second motor 30 by an available power margin factor of the second motor 30 according to the temperature of the second motor 30 and the outdoor temperature.

In an operation 1480, the vehicle 1 may determine a charge/discharge power allowance of the second motor 30 by considering a margin factor based on an SoC of the battery 10.

The controller 160 may determine the charge/discharge power allowance of the second motor 30 by considering the margin factor based on the SoC of the battery 10.

In an operation 1490, the vehicle 1 may determine a maximum value/minimum value torque by vehicle speed based on the available power of the second motor 30 (1490).

The controller 160 may determine a maximum value and a minimum value of (i) the driver demand power allowance determined in the operation 1430, (ii) the charge/discharge power limit of the battery 10 determined in the operation 1450, (iii) the charge/discharge power limit of the second motor 30 determined in the operation 1460, (iv) the charge/discharge power allowance of the second motor 30 determined in the operation 1470, and (v) the charge/discharge power allowance of the second motor 30 determined in the operation 1480.

In an operation 1495, the vehicle 1 may determine a torque command of the second motor 30.

The controller 160 may determine the torque command of the second motor 30 based on the maximum value and the minimum value of (i) the driver demand power allowance, (ii) the charge/discharge power limit of the battery 10, (iii) the charge/discharge power limit of the second motor 30, and (iv) the charge/discharge power allowance of the second motor 30.

As should be apparent from the above, according to embodiments of the present disclosure, a vehicle and a control method thereof can limit a charge/discharge power of a battery during torque vectoring control.

The vehicle and the control method thereof can limit a motoring/generating torque of a motor during torque vectoring control.

Although embodiments of the present disclosure have been described for illustrative purposes, those having ordinary skill in the art should appreciate that various modifications, additions and substitutions are possible, without departing from the scope and spirit of the present disclosure. Embodiments have not been described for limiting purposes.

What is claimed is:

1. A vehicle, comprising:
   a battery;
   a first motor configured to provide a first wheel and a second wheel of the vehicle with a driving force of the vehicle;
   a second motor configured to provide the first wheel and the second wheel with different rotational forces;
   a controller configured to output a first torque command of the first motor and a second torque command of the second motor;

a first motor driver configured to convert power output from the battery in response to the first torque command to control a driving current of the first motor; and a second motor driver configured to convert power output from the battery in response to the second torque command to control a driving current of the second motor, wherein the controller is configured to
determine a first torque limit of the first motor based on a state of charge (SoC) of the battery and a rotational speed of the first motor, and
determine a second torque limit of the second motor based on the SoC of the battery, a rotational speed of the second motor, and the first torque limit of the first motor.

2. The vehicle of claim 1, wherein the controller is configured to:
determine a driver demand torque based on a driving speed of the vehicle and at least one of a pedal value of an accelerator pedal of the vehicle or a pedal value of a brake pedal of the vehicle;
determine a demand torque margin based on the driver demand torque, a demand torque according to the driving speed, and a demand torque margin factor; and
determine a driver demand torque allowance based on the driver demand torque and the demand torque margin.

3. The vehicle of claim 2, wherein the controller is configured to:
determine a first charge/discharge torque limit of the first motor based on the rotational speed and a torque of the first motor; and
determine a second charge/discharge torque limit of the first motor based on a margin factor based on a difference between a temperature of the first motor and an outdoor temperature.

4. The vehicle of claim 3, wherein the controller is configured to determine the first torque command of the first motor based on a minimum value of the driver demand torque allowance, the first charge/discharge torque limit, and the second charge/discharge torque limit.

5. The vehicle of claim 2, wherein the controller is configured to:
determine a third charge/discharge torque limit of the second motor based on the rotational speed and a torque of the second motor;
determine a fourth charge/discharge torque limit of the second motor based on a margin factor based on a difference between a temperature of the second motor and an outdoor temperature; and
determine a fifth charge/discharge torque limit of the second motor based on a margin factor based on a difference between a temperature of the first motor and the temperature of the second motor.

6. The vehicle of claim 5, wherein the controller is configured to determine the second torque command of the second motor based on a minimum value of the driver demand torque allowance, the third charge/discharge torque limit, the fourth charge/discharge torque limit, and the fifth charge/discharge torque limit.

7. The vehicle of claim 1, wherein the controller is configured to:
determine a driver demand power based on a driving speed of the vehicle and at least one of a pedal value of an accelerator pedal of the vehicle or a pedal value of a brake pedal of the vehicle;

determine a demand power margin based on the driver demand power, a demand power according to the driving speed, and a demand power margin factor; and
determine a driver demand power allowance based on the driver demand power and the demand power margin.

8. The vehicle of claim 7, wherein the controller is configured to:
determine an available power of the battery based on a charge/discharge power of the battery and a power consumption of an electrical load of the vehicle;
determine a first charge/discharge power limit of the first motor based on the rotational speed and a torque of the first motor; and
determine a second charge/discharge power limit of the first motor based on a margin factor based on a difference between a temperature of the first motor and an outdoor temperature.

9. The vehicle of claim 8, wherein the controller is configured to determine the first torque command of the first motor based on a minimum value of the driver demand power allowance, the available power of the battery, the first charge/discharge power limit, and the second charge/discharge power limit.

10. The vehicle of claim 7, wherein the controller is configured to:
determine an available power of the battery based on a charge/discharge power of the battery and a power consumption of an electrical load of the vehicle;
determine a third charge/discharge power limit of the second motor based on the rotational speed and a torque of the second motor; and
determine a fourth charge/discharge power limit of the second motor based on a margin factor based on a difference between a temperature of the second motor and an outdoor temperature.

11. The vehicle of claim 10, wherein the controller is configured to determine the second torque command of the second motor based on a minimum value of the driver demand power allowance, the available power of the battery, the third charge/discharge power limit, and the fourth charge/discharge power limit.

12. A control method of a vehicle having a first wheel, a second wheel, a battery, a first motor, and a second motor, the control method comprising:
providing the first wheel and the second wheel with a driving force of the vehicle using the first motor;
providing the first wheel and the second wheel with different rotational forces using the second motor;
determining a first torque limit of the first motor based on a state of charge (SoC) of the battery and a rotational speed of the first motor;
determining a second torque limit of the second motor based on the SoC of the battery, a rotational speed of the second motor, and the first torque limit of the first motor;
controlling a driving current of the first motor based on the first torque limit of the first motor; and
controlling a driving current of the second motor based on the second torque limit of the second motor.

13. The control method of claim 12, further comprising:
determining a driver demand torque based on a driving speed of the vehicle and at least one of a pedal value of an accelerator pedal of the vehicle or a pedal value of a brake pedal of the vehicle;
determining a demand torque margin based on the driver demand torque, a demand torque according to the driving speed, and a demand torque margin factor; and determining a driver demand torque allowance based on the driver demand torque and the demand torque margin.

14. The control method of claim 13, wherein determining the first torque limit of the first motor comprises:
determining a first charge/discharge torque limit of the first motor based on the rotational speed and a torque of the first motor;
determining a second charge/discharge torque limit of the first motor based on a margin factor based on a difference between a temperature of the first motor and an outdoor temperature; and
determining a torque command of the first motor based on a minimum value of the driver demand torque allowance, the first charge/discharge torque limit, and the second charge/discharge torque limit.

15. The control method of claim 13, wherein determining the second torque limit of the second motor further comprises:
determining a third charge/discharge torque limit of the second motor based on the rotational speed and a torque of the second motor;
determining a fourth charge/discharge torque limit of the second motor based on a margin factor based on a difference between a temperature of the second motor and an outdoor temperature;
determining a fifth charge/discharge torque limit of the second motor based on a margin factor based on a difference between a temperature of the first motor and the temperature of the second motor; and
determining a torque command of the second motor based on and a minimum value of the driver demand torque allowance, the third charge/discharge torque limit, the fourth charge/discharge torque limit, and the fifth charge/discharge torque limit.

16. The control method of claim 12, further comprising:
determining a driver demand power based on a driving speed of the vehicle and at least one of a pedal value of an accelerator pedal of the vehicle or a pedal value of a brake pedal of the vehicle;
determining a demand power margin based on the driver demand power, a demand power according to the driving speed, and a demand power margin factor; and
determining a driver demand power allowance based on the driver demand power and the demand power margin.

17. The control method of claim 16, wherein determining the first torque limit of the first motor comprises:
determining an available power of the battery based on a charge/discharge power of the battery and a power consumption of an electrical load of the vehicle;
determining a first charge/discharge power limit of the first motor based on the rotational speed and a torque of the first motor;
determining a second charge/discharge power limit of the first motor based on a margin factor based on a difference between a temperature of the first motor and an outdoor temperature; and
determining a torque command of the first motor based on a minimum value of the driver demand power allowance, the available power of the battery, the first charge/discharge power limit, and the second charge/discharge power limit.

18. The control method of claim 17, wherein determining the second torque limit of the second motor comprises:
determining the available power of the battery based on the charge/discharge power of the battery and the power consumption of the electrical load of the vehicle;
determining a third charge/discharge power limit of the second motor based on the rotational speed and a torque of the second motor;
determining a fourth charge/discharge power limit of the second motor based on a margin factor based on a difference between a temperature of the second motor and an outdoor temperature; and
determining a torque command of the second motor based on a minimum value of the driver demand power allowance, the available power of the battery, the third charge/discharge power limit, and the fourth charge/discharge power limit.

* * * * *